United States Patent
Girardeau et al.

(10) Patent No.: US 11,549,394 B2
(45) Date of Patent: Jan. 10, 2023

(54) TURBINE CASING COOLING DEVICE FOR A TURBOMACHINE

(71) Applicant: SAFRAN AIRCRAFT ENGINES, Paris (FR)

(72) Inventors: Julian Nicolas Girardeau, Moissy-Cramayel (FR); Maxime Aurélien Rotenberg, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/299,702

(22) PCT Filed: Dec. 3, 2019

(86) PCT No.: PCT/FR2019/000198
§ 371 (c)(1),
(2) Date: Jun. 3, 2021

(87) PCT Pub. No.: WO2020/115374
PCT Pub. Date: Jun. 11, 2020

(65) Prior Publication Data
US 2022/0018264 A1   Jan. 20, 2022

(30) Foreign Application Priority Data

Dec. 7, 2018 (FR) ........................ 1872479

(51) Int. Cl.
*F01D 25/14* (2006.01)
*F01D 9/06* (2006.01)
*F01D 11/24* (2006.01)

(52) U.S. Cl.
CPC ............ *F01D 25/14* (2013.01); *F01D 9/06* (2013.01); *F01D 11/24* (2013.01);
(Continued)

(58) Field of Classification Search
None
See application file for complete search history.

(56) References Cited

U.S. PATENT DOCUMENTS 1,938,241 A * 12/1933 Banfield ................. F23L 13/00
  110/286
4,899,957 A * 2/1990 Eickmann ............... B64C 27/04
  244/17.11

(Continued)

FOREIGN PATENT DOCUMENTS

| FR | 2867806 A1 | 9/2005 |
| FR | 2999226 A1 | 6/2014 |
| FR | 3002971 A1 | 9/2014 |

OTHER PUBLICATIONS

International Search Report of the International dated Jul. 24, 2020 for corresponding International Patent Application No. PCT/FR2019/000198, filed on Dec. 3, 2019, and its English translation thereof, 7 pages.

(Continued)

*Primary Examiner* — Michael Lebentritt
(74) *Attorney, Agent, or Firm* — Christensen O'Connor Johnson Kindness PLLC

(57) ABSTRACT

The disclosure provides devices for cooling a turbine casing for a turbomachine and methods of using the same. The devices extend around an axis (X) and include air-distribution means configured to take in air and convey it to the casing. The air-distribution means include a first ramp and a second ramp extending circumferentially about the axis (X), each ramp having air ejection orifices intended to be directed towards the casing in order to cool it The devices further include adjustment means capable of adjusting the flow rate of air ejected at the level of the first ramp with respect to the flow rate of air ejected at the level of the second ramp.

7 Claims, 2 Drawing Sheets

(52) U.S. Cl.
CPC .. *F05D 2220/323* (2013.01); *F05D 2260/232* (2013.01); *F05D 2260/601* (2013.01)

(56) References Cited

U.S. PATENT DOCUMENTS

| | | | | |
|---|---|---|---|---|
| 5,230,616 | A * | 7/1993 | Serizawa | F04C 29/0021 418/151 |
| 5,794,942 | A * | 8/1998 | Vance | F16J 15/406 277/303 |
| 6,149,074 | A * | 11/2000 | Friedel | F01D 11/24 239/127.1 |
| 6,896,038 | B2 * | 5/2005 | Arilla | F01D 25/12 165/47 |
| 7,309,209 | B2 * | 12/2007 | Amiot | F01D 11/24 415/136 |
| 7,503,179 | B2 * | 3/2009 | Estridge | F01D 11/24 60/782 |
| 8,100,633 | B2 * | 1/2012 | Propheter-Hinckley | F02C 7/18 415/115 |
| 8,152,446 | B2 * | 4/2012 | Zhang | F01D 11/24 415/108 |
| 9,341,074 | B2 * | 5/2016 | Schimmels | F01D 25/12 |
| 10,294,818 | B2 * | 5/2019 | Huning | F01D 19/00 |
| 10,378,379 | B2 * | 8/2019 | Manteiga | F04D 19/00 |
| 10,844,789 | B2 * | 11/2020 | Bunel | F01D 25/14 |
| 2005/0271499 | A1 * | 12/2005 | Loy | F01D 21/04 415/1 |
| 2010/0150544 | A1 * | 6/2010 | Koop | G03B 9/08 396/453 |
| 2013/0084162 | A1 | 4/2013 | Sano et al. | |
| 2019/0186368 | A1 * | 6/2019 | Sharma | F02C 7/26 |
| 2020/0271011 | A1 * | 8/2020 | Comandore | B64D 31/00 |

OTHER PUBLICATIONS

Written Opinion dated Jul. 22, 2020 for corresponding International Patent Application No. PCT/FR2019/000198, filed on Dec. 3, 2019, 7 pages.

* cited by examiner

TURBINE CASING COOLING DEVICE FOR A TURBOMACHINE

CROSS-REFERENCES TO RELATED APPLICATIONS

This application is a National Stage of International Application No. PCT/FR2019/000198 filed Dec. 3, 2019, which claims priority to French Patent Application No. 1872479, filed Dec. 7, 2018, the entire disclosures of which are hereby incorporated by reference.

FIELD OF THE DISCLOSURE

Embodiments of the present disclosure relate to a turbine casing cooling device for a turbomachine, such as a jet engine, in particular a turbofan engine.

BACKGROUND

A turbofan engine typically has a fan downstream of which the following elements extend:
  a primary vein in which a primary flow circulates, the primary vein passing through, in the direction of the primary flow circulation, a low-pressure compressor, a high-pressure compressor, a combustion chamber, a high-pressure turbine and a low-pressure turbine, the primary vein being externally delimited at the turbine by a turbine casing,
  a secondary vein in which a secondary flow, distinct from the primary flow, circulates, The primary air flow from the turbine chamber has a high temperature and heats up the downstream parts. In order to avoid contact between the fixed and moving parts of the turbine during operation due to differential expansion, it is necessary to provide effective means of cooling which can be easily integrated into the environment of the turbojet engine and which make it possible to control this differential expansion by controlling the temperature of the parts during operation.

The terms 'upstream' and 'downstream' are defined with respect to the gas flows through the turbomachine. The terms 'radial', 'axial' and 'circumferential' are defined with respect to the axis of the turbomachine.

The patent application FR 2 867 806, in the name of the Applicant, discloses a device for cooling a turbine casing for a turbomachine comprising means for sampling and supply air and means for distributing the sampled air including ramps extending circumferentially about the axis of the turbomachine. The ramps are connected to the air intake and supply means by connecting areas. Each ramp has orifices distributed along the ramp, with the extracted air being intended to escape from these orifices to cool the casing.

The orifices are uniformly distributed along each ramp so that the flow rate is relatively uniform around the circumference of the casing.

In addition, the turbine rotor has blades whose radially outer ends cooperate with one or more rings of material that can be abraded during operation.

It was found that during operation the rotor is subject to eccentricities or excursions in the radial plane, in particular, the rotor can undergo strong accelerations during these excursions, which leads to the formation of localized circumferential wear of the rings made of abradable material, thus penalizing the efficiency of the turbomachine. In other words, such wear extends over an angular portion of the turbomachine only and is not annular.

There is currently a need to be able to compensate locally for such wear and tear.

Document FR 3 002 971 discloses a device for cooling a turbine casing of a turbomachine.

SUMMARY

Embodiments of the disclosure more particularly aim at providing a simple, efficient and cost-effective solution to this problem.

For this purpose, the disclosure proposes a device for cooling a turbine casing for a turbomachine, such as, for example, an aircraft turbojet engine, extending around an axis and comprising air distribution means configured to take in air and convey it towards the casing, the air distribution means comprising at least a first ramp and a second ramp extending circumferentially around the axis, respectively on a first circumferential portion and on a second circumferential portion which are different from each other, each ramp comprising air ejection orifices intended to be directed towards the casing in order to cool it, characterized in that it comprises adjustment means configured to adjusting the flow rate of air ejected at the first ramp with respect to the flow rate of air ejected at the second ramp.

In this way, it is possible to adapt the cooling of the housing, and thus the contraction of the housing, to different circumferential portions of the housing. The clearance between the blade tips and the rings of abradable material can therefore be changed locally by contraction of the housing in the target area, locally increasing or reducing the cooling of the housing over a certain circumferential portion of the housing.

The adjusting means may comprise means for reducing the cross-sectional area of the air flow arranged in the air-distribution means.

The device may comprise at least a first collector and a second collector, connected to the air-distribution means via a first branch and a second branch respectively, each extending circumferentially in an opposite direction, the first ramp and the second ramp extending circumferentially from the first collector and from the second collector respectively.

The two collectors are thus circumferentially spaced from each other.

The means for reducing the cross-section may be capable of adjusting the cross-section of the first branch and/or the second branch, so as to adjust the air flow rate in each of the branches.

Each branch may comprise a first end connected to the air intake and supply means and a second end connected to the corresponding collector, the vein reduction means being located at the first end and/or the second end of the corresponding branch.

The means for reducing the cross-section may also be located in a middle area of the corresponding branch.

The means for reducing the cross-section may be able to adjust the cross-section of the first ramp and/or the second ramp, at the junction area between the ramp and the collector.

In particular, the means for reducing the cross-section are in this case located upstream of the ejection orifices of the corresponding ramp. The terms 'upstream' and 'downstream' are used in reference to the general direction of the cooling air flow through the cooling device.

The means for reducing the cross-section may comprise at least one adjustable damper or diaphragm.

The adjustable damper may be an iris damper. The structure of such a damper is already known in itself.

The device may comprise at least one pair of first ramps and at least one pair of second ramps, the ramps of a pair extending circumferentially opposite each other from the corresponding collector.

The number of ramp pairs per collector can be between 2 and 10.

The first and second ramps can cover an area of the housing extending angularly over 360°. In other words, the entire outer annular surface of the housing can be cooled by the ramps.

The disclosure also relates to a turbofan engine, comprising a fan downstream of which the following elements extend:
- a primary vein in which a primary flow circulates, the primary vein passing through, in particular, in the direction of circulation of the primary flow, a compressor, a combustion chamber and a turbine comprising a turbine casing,
- a secondary vein in which a secondary flow, distinct from the primary flow, circulates characterized in that it comprises a cooling device of the abovementioned type, the ramp extending circumferentially around the axis of the turbojet and being located radially outside the turbine casing, the orifices being turned towards the the turbine casing, the air intake and supply means being configured to take in air from the secondary vein.

The disclosure also relates to a method of managing a cooling device of a turbine casing of an aircraft turbojet engine of the above type, comprising the steps of:
- measuring along two different axes, for example two orthogonal axes, the accelerations experienced by the airframe and/or propulsion system of the aircraft,
- determining the eccentricity of the rotor from the measured accelerations,
- adjusting the adjusting means so as to adapt the air flow rate ejected at the first ramp to the air flow rate ejected at the second ramp.

It is recalled that the airframe of an aircraft consists of the fuselage, wing, tailplane (horizontal stabilizer and vertical stabilizer) and landing gear of the aircraft. The propulsion system consists of the turbomachine and the nacelle surrounding the turbomachine.

The disclosure will be better understood and other details, characteristics and advantages of the disclosure will appear when reading the following description, which is given as a non-limiting example, with reference to the attached drawings.

DETAILED DESCRIPTION

Figure 1:
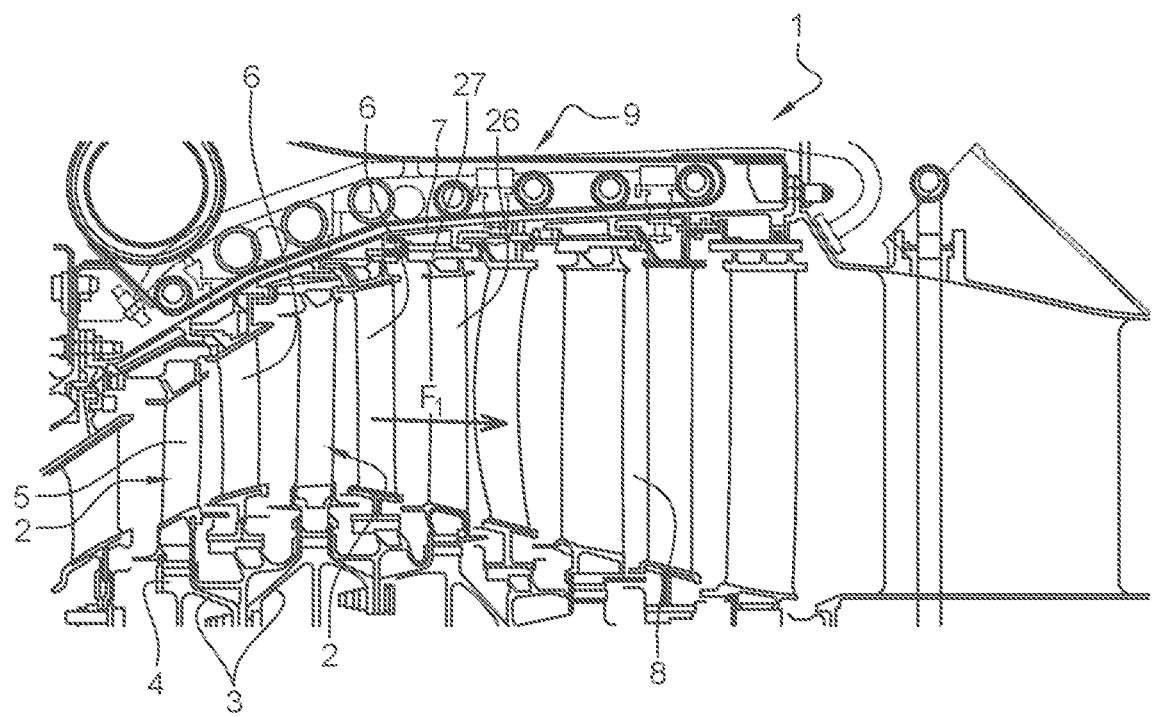
FIG. 1 is an axial sectional view of a portion of a turbofan according to one embodiment of the disclosure.

FIG. 1 illustrates a part of a turbofan engine according to the disclosure, in particular the low-pressure turbine 1. This comprises a rotor with wheels 2 axially connected to each other by annular flanges 3 and each comprising a disc 4 bearing blades 5.

Annular rows of stationary vanes 6 are mounted by suitable means at their radially outer ends on a case 7 of the low-pressure turbine 1 between the mobile wheels 2. The fixed blades 6 of each row are joined together at their radially inner ends by annular sectors placed circumferentially end to end.

As previously mentioned, the primary air flow F1 from the combustion chamber into the primary air vein 8 heats the casing 7.

Figure 2:
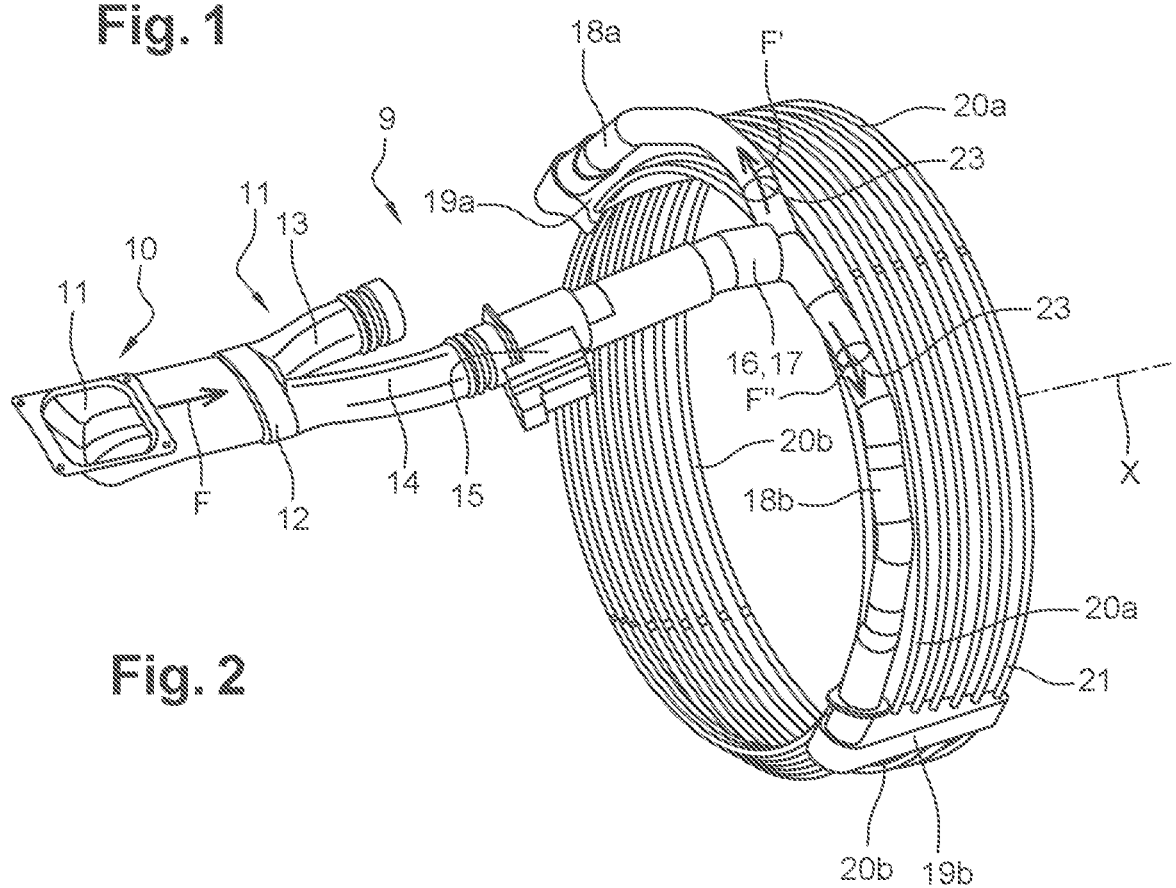
FIG. 2 is a cross-sectional view of the cooling device according to the disclosure.

In order to ensure the cooling of the casing 7, the turbojet engine has a cooling device 9, best seen in FIG. 2.

The latter includes air intake and supply means comprising:
- a scoop 10 comprising an opening 11 leading, for example, into the secondary vein of the turbojet engine in order to take cold air from it,
- a connecting member 11 having a general Y shape comprising an upstream part 12 connected to the scoop 10, and a downstream part comprising a first branch 13 whose function will not be detailed here, and a second branch 14,
- a control valve 15 connected downstream of the second branch 14 and configured to be controlled as a function of engine speed and/or flight conditions, for example, so as to adjust the flow rate taken in,
- a distribution member 16 formed from one or more parts and comprising an upstream part 17 connected to the outlet of the control valve 15, and at least two downstream branches 18a and 18b extending circumferentially around the axis of the turbojet engine, on either side of the downstream end of the upstream part 17. Each branch 18a, 18b extends for example about 90°.

The device 9 further comprises collectors or connecting areas 19a, 19b, here two in number, connected to the corresponding ends of the branches 18a, 18b, each collector 19a, 19b forming an axially extending channel.

Of course, the number of collectors 19a, 19b may vary, and may be four, for example.

The cooling flow through the air intake and supply means is illustrated by arrows in FIG. 2 (referenced F at the scoop 10 and F', F''' at the branches 18a, 18b respectively).

The device 9 further comprises ramps 20a, 20b (or more generally noted 20) formed by curved pipes of circular cross-section, each ramp 20a, 20b extends circumferentially at an angle of about 90°, more precisely of the order of 90° here.

Each ramp 20 has a proximal end 21 opening into the corresponding collector channel 19 and a closed distal end 22. Each ramp 20 also has orifices facing the casing 7 so that the air taken in through the scoop 10, the member 11, the valve 15 and the distribution member 16 enters the collectors 19a, 19b and then the ramps 20 before emerging through the orifices facing the casing 7, so as to cool it.

The two collectors 19a, 19b are diametrically opposed, each collector 19a, 19b being associated with a plurality of pairs of ramps 20, namely ramps 20a extending circumferentially on one side and ramps 20b extending circumferentially on the opposite side. Thus, each collector 19a, 19b and the associated opposing ramps 20a, 20b cover an angular range of approximately 180°. In the embodiment shown in the FIGURES, each collector 19a, 19b is associated with several pairs of ramps, for example nine pairs of ramps 20a, 20b. The ramps 20a, 20b of the same pair are located on the same radial plane, the ramps 20a, 20b of different pairs being offset from each other along the X axis of the turbomachine, as seen in FIG. 2.

The two collectors 19a, 19b and the associated pairs of ramps 20 have substantially identical structures and are arranged diametrically opposite each other.

In this way, the ramps 20 are located on several radial planes axially offset from each other, the ramps 20 of the same radial plane forming a cooling ring surrounding the casing 7 which extends substantially over the entire periphery of the casing, i.e. substantially 360°.

Figure 3:
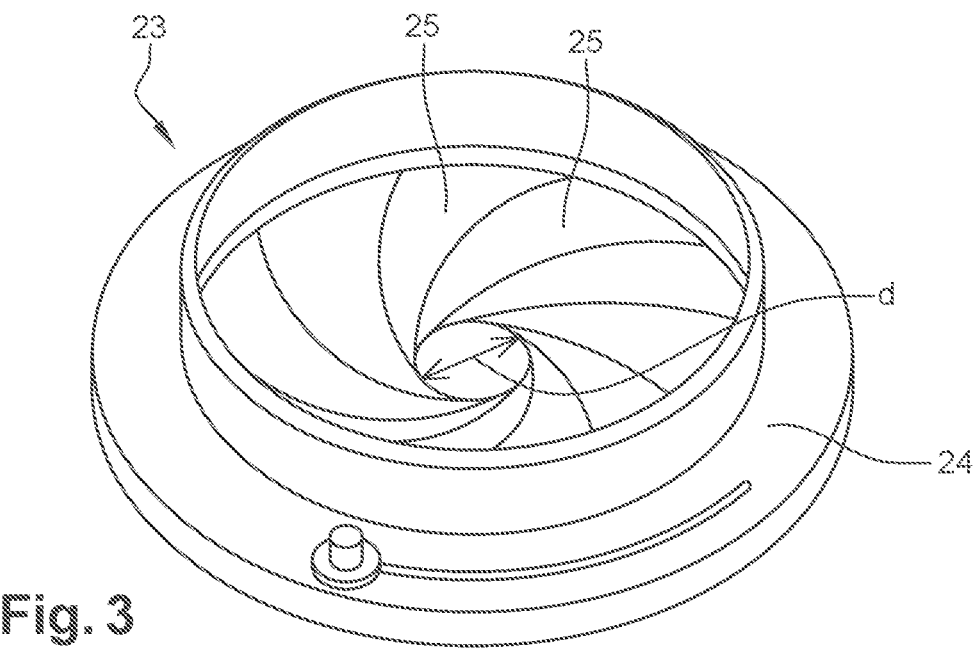
FIG. 3 is a perspective view of an iris damper.

At least one of the branches 18a, 18b, or each of the banks 18a, 18b may include means for adjusting the cross-section of the corresponding branch, for example in the form of an iris damper 23, the structure of which is shown in FIG. 3. Such a damper 23 comprises a fixing ring 24 and movable blades 25 whose position can be changed so as to adjust the internal diameter d of the damper 23, delimited by the blades 25.

The position of such a damper 23 in each of the branches 18a, 18b is schematically shown in FIG. 2. Each damper 23 may be located near the end of the corresponding branch 18a, 18b connected to the upstream portion 17, or near the end of the corresponding branch 18a, 18b connected to the corresponding collector 19a, 19b, for example.

Each damper 23 may also be located in a middle region of the corresponding branch 18a, 18b.

Figure 4:
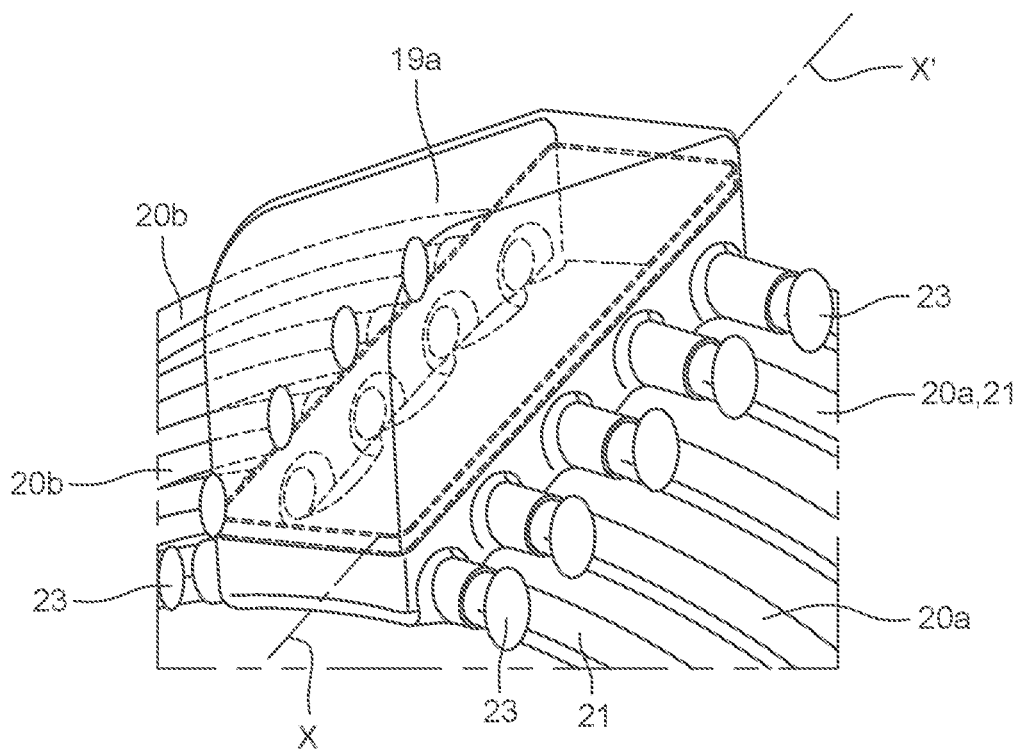
FIG. 4 is a perspective view, in detail, illustrating another embodiment of the device according to the disclosure.

According to another embodiment illustrated schematically in FIG. 4, means for adjusting the cross-section 23 may be provided on the ramps 20a, 20b, at their ends 21 connected to the corresponding collector 19a, 19b. As before, such vein adjustment means may be formed by iris dampers 23.

Such adjusting means 23 allow to adapt the air flow rate ejected at the ramps 20 connected to the collector 19a, with respect to the air flow rate ejected at the ramps 20 connected to the collector 19b. It is therefore possible to cool two circumferential zones of the housing 7 in a differentiated manner from each other. This allows, for example, the casing 7 to contract locally in a selected circumferential area in order to limit the clearance between the rotor blades 26 (FIG. 1) and the abradable rings 27 supported by the casing 7, for example.

The overall flow rate can also be adjusted by means of the control valve 15.

The embodiment shown in FIG. 4 allows the wear compensation to be controlled axially. Indeed, for the same load, it appears that the eccentricity of the rotor (and therefore the wear generated) is not axially uniform. By arranging adjustment means downstream of the collector 19a, 19b so as to be able to adjust the flow of cooling air individually in each of the ramps 20, it is possible to compensate for the clearance as accurately as possible and as required, and thus to limit the consumption of cooling flow which penalizes the performance of the turbomachine.

In operation, in the case of a turbomachine with low wear of the abradable rings 27, the cross-sections of the branches 18a, 18b or ramps 20 are reduced or flanged using the aforementioned cross-section adjustment means 23. As wear and tear is observed and a clearance appears locally between the ends of the rotor blades 26 and the corresponding abradable rings 27, some of the ramps 20 may be supplied with a higher air flow rate, by increasing the cross-section of the ramps 20 or the branches 18a, 18b concerned. The increase in the flow of cooling air causes a local contraction of the casing 7 and locally reduces the aforementioned clearance, which makes it possible to restore the performance of the turbomachine close to the nominal performance when the turbomachine is new.

The clearance check can be performed at the time of a maintenance period, for example every 500 to 1000 flight hours. The cross-sections of the branches 20 or ramps 18a, 18b can then be adapted accordingly.

The aforementioned local clearance may be calculated on the basis of rotor eccentricity measurements obtained with specific accelerometers or clearance sensors, located at the airframe and/or propulsion system of the aircraft.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The invention claimed is:

1. A method for managing a cooling device for a turbine casing of an aircraft engine extending along an axis (X), the aircraft engine having a fan downstream of which extends a compressor, a combustion chamber and a turbine comprising a turbine casing, the aircraft engine further having:
    a primary vein in which a primary flow (F1) circulates, said primary vein passing through in a direction of circulation of the primary flow (F1), the compressor, the combustion chamber and the turbine comprising the turbine casing,
    a secondary vein into which flows a secondary flow from the fan, wherein the secondary flow is distinct from the primary flow, the secondary vein extending around the primary vein,
    wherein the aircraft engine further includes a device for cooling the turbine casing, said cooling device having air-distribution means configured to take in air and convey the air to the turbine casing, the air-distribution means having at least a first ramp and a second ramp extending circumferentially about the axis (X) respectively on a first circumferential portion and on a second circumferential portion different from each other, each of the first ramp and second ramp comprising air ejection orifices configured to be directed towards the turbine casing in order to cool the turbine casing, the cooling device further having adjustment means capable of adjusting an air flow rate of air ejected at the first ramp with respect to an air flow rate of air ejected at the second ramp,
    each of the first ramp and second ramp extending circumferentially about the axis (X) and being located radially outside the turbine casing, the air ejection orifices of the ramp and second ramp being turned towards the said turbine casing,
    the method comprising:
    measuring along two different axes accelerations experienced by at least one of an airframe or a propulsion system of an aircraft;
    determining an eccentricity of a rotor from the measured accelerations; and
    adjusting the adjustment means so as to adapt the air flow rate ejected at the first ramp to the air flow rate ejected at the second ramp depending on the determined eccentricity of the rotor.

2. The method according to claim 1, wherein the adjustment means comprise means for reducing an air flow cross-section arranged in the air-distribution means.

3. The method according to claim 1 wherein the cooling device comprises at least a first collector and a second collector connected to the air-distribution means via a first branch and a second branch respectively, each extending circumferentially in an opposite direction, the first collector and the second collector extending circumferentially from the first collector and the second collector respectively.

4. The method according to claim 3, wherein the means for reducing the air flow cross-section are able to adjust an air flow cross-section of at least one of the first branch or the second branch.

5. The method according to claim 4, wherein the means for reducing the air flow cross-section are able to adjust at least one of the air flow cross-section of the first ramp or the air flow cross-section of the second ramp, at a junction area between said first ramp or second ramp and the first collector or second collector, respectively.

6. The method according to claim 5, wherein the means for reducing the air flow cross-section comprises at least one adjustable damper.

7. The method according to claim 6, wherein said adjustable damper is an iris damper.

\* \* \* \* \*